United States Patent [19]
Doane

[11] 4,308,676
[45] Jan. 5, 1982

[54] LAWN MOWER POWER TAKE-OFF AND ACCESSORIES

[76] Inventor: Maurice S. Doane, 3014 S.W. 40th, Des Moines, Iowa 50321

[21] Appl. No.: 169,500

[22] Filed: Jul. 16, 1980

[51] Int. Cl.³ ............................................. E01H 5/00
[52] U.S. Cl. .................................... 37/43 L; 56/16.9
[58] Field of Search .............. 56/16.9; 37/43 L, 43 D, 37/43 R

[56] References Cited
U.S. PATENT DOCUMENTS

| | | | |
|---|---|---|---|
| 3,286,376 | 11/1966 | Wildes | 37/43 L |
| 3,803,818 | 4/1974 | Chaney | 56/16.9 |
| 4,190,973 | 3/1980 | Schmidt | 37/43 D |

*Primary Examiner*—Jay N. Eskovitz
*Attorney, Agent, or Firm*—Henderson & Sturm

[57] ABSTRACT

A lawn mower power take-off located above the lawn mower deck of the housing and adapted to be used to power lawn implements or accessories including a snow blower having a unique air assist mechansim.

9 Claims, 9 Drawing Figures

U.S. Patent  Jan. 5, 1982  Sheet 1 of 2  4,308,676
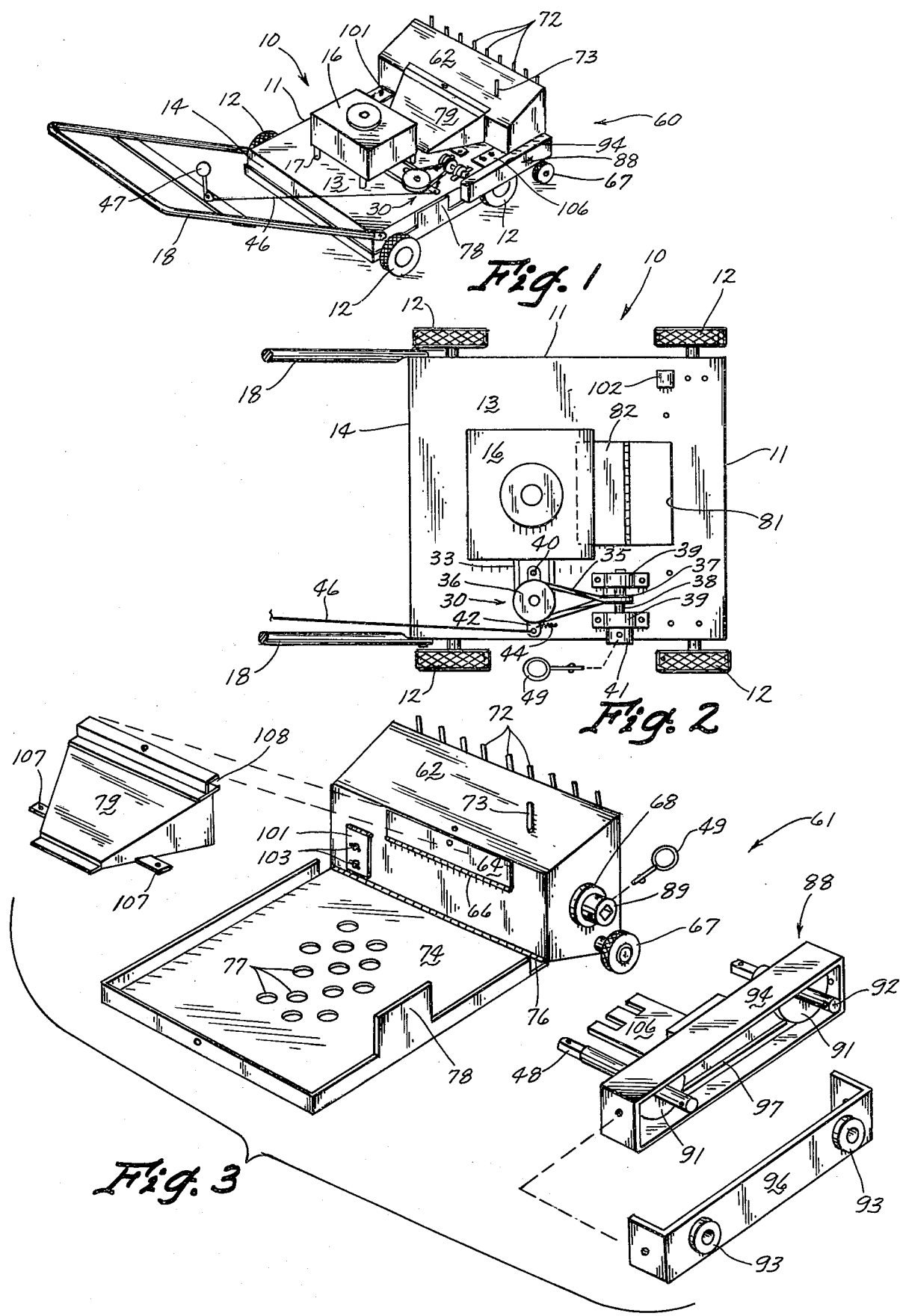

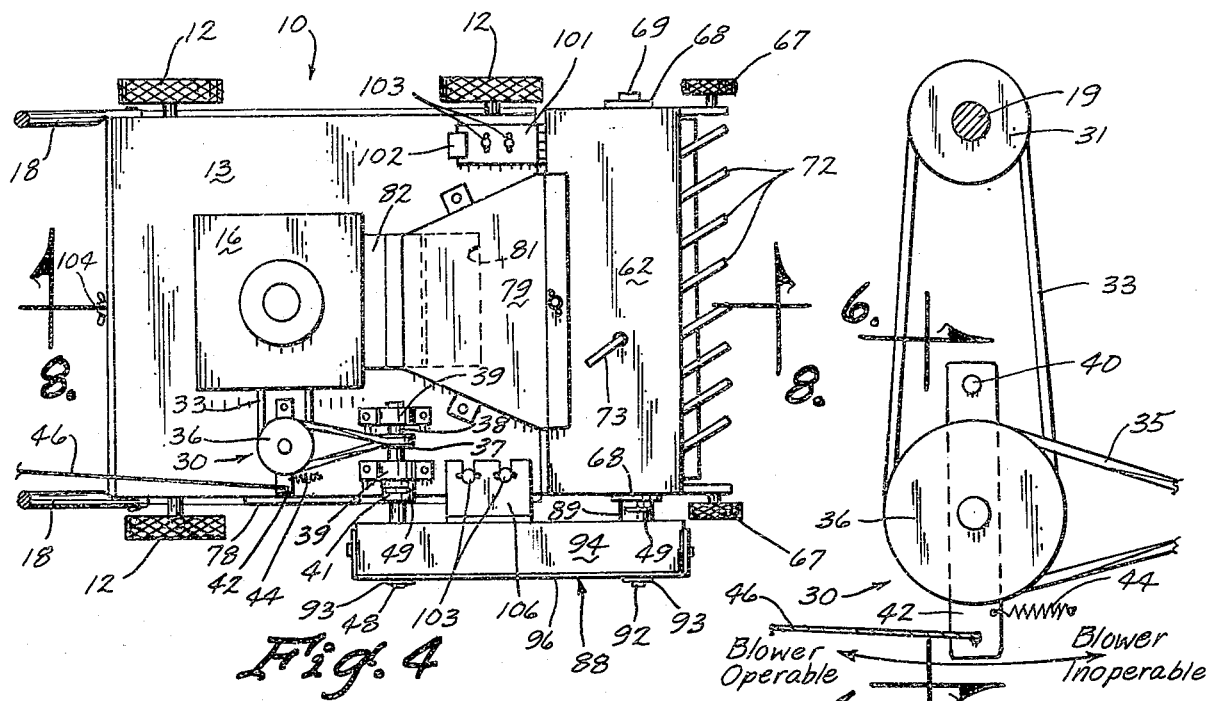
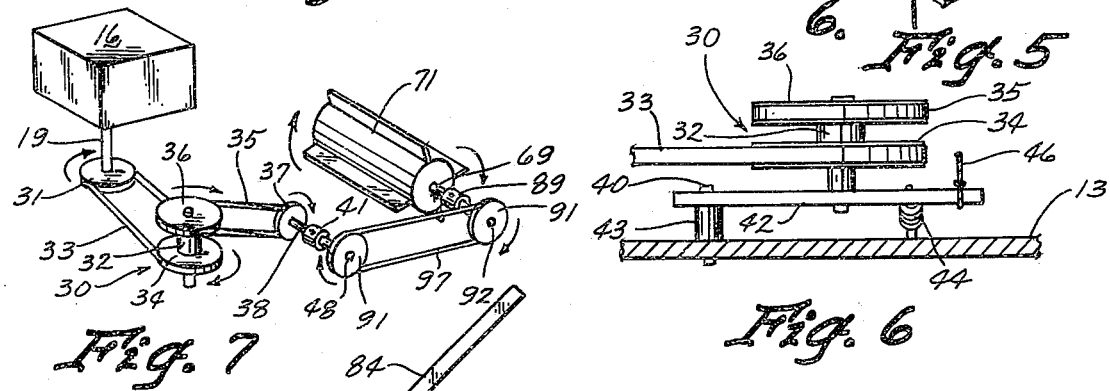
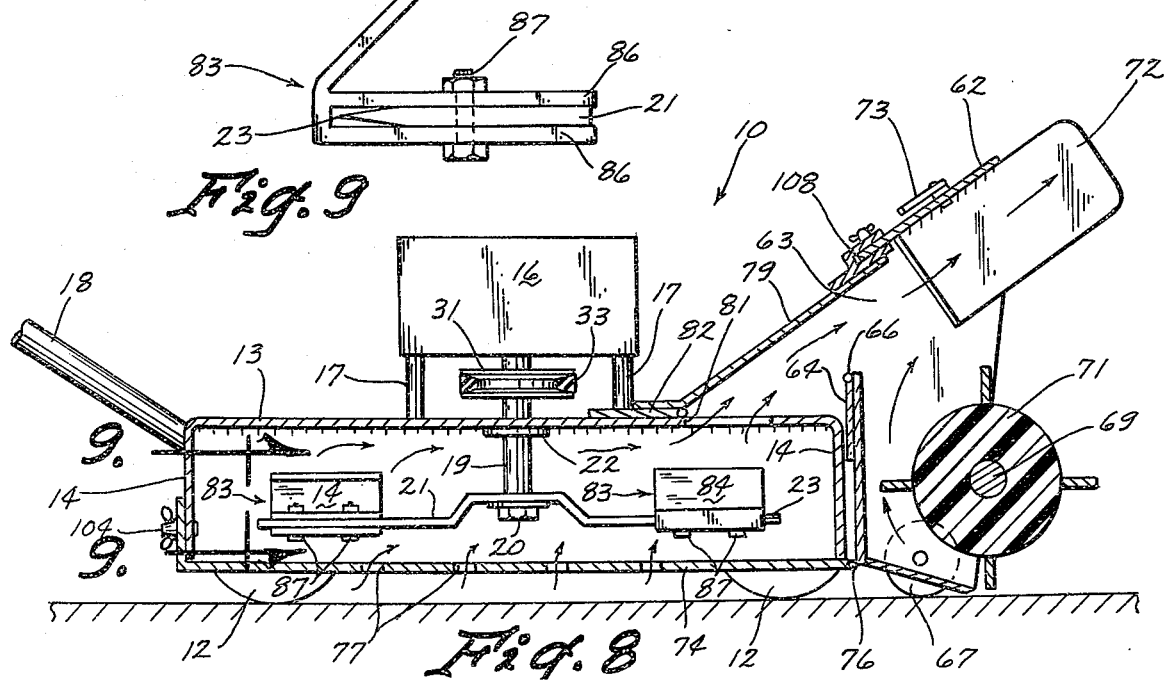

LAWN MOWER POWER TAKE-OFF AND ACCESSORIES

BACKGROUND OF THE INVENTION

The present invention relates generally to lawn implements and more particularly to a lawn mower power take-off which is disposed above the deck of a lawn mower and adapted for use with a number of accessories including a snow blower having an air assist mechanism.

Previous attempts to use the portable power source of a lawn mower engine to power other lawn implements or accessories have not been practical due to the complex structures required and the great effort needed to mount the accessories on the lawn mower frame. Also, the location of the drive train of the power take-off under the lawn mower housing exposes the drive train to debris and a build-up of material which results in numerous maintenance problems. Those concerned with these problems recognize the need for an improved power take-off adaptable for use with accessories to be powered by the lawn mower engine.

SUMMARY OF THE INVENTION

The lawn mower power take-off of the present invention includes a drive train operably connected to the drive shaft of a lawn mower engine at a point above the deck of the lawn mower. The positioning of the drive train above the lawn mower deck allows the drive train to be conveniently used with a number of accessories and removes the working mechanism of the drive train from the build-up of material and exposure to debris encountered beneath the lawn mower housing. The drive train is used to provide a convenient source of power for a variety of implements or accessories, including a snow blower having an unique air assist mechanism which contributes to the efficient operation of the snow blower.

An object of the present invention is the provision of an improved lawn mower power take-off.

Another object is to provide a power take-off which is easily usable to power a variety of accessories.

A further object of the invention is the provision of a power take-off which is easy to maintain and operate.

Still another object is to provide an unique attachable air assist mechanism useful in conjunction with the accessories, such as snow blowers or leaf blowers.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the lawn mower power take-off of this invention wherein the power take-off operably connects the engine of the lawn mower to drive an attachable snow blower;

FIG. 2 is a top plan view showing the drive train attached to the deck of the lawn mower;

FIG. 3 is an exploded perspective view showing the attachable snow blower and intermediate drive which connects the drive train of the power take-off to the impeller of the snow blower;

FIG. 4 is a top plan view similar to FIG. 2, but showing the snow blower attached to the lawn mower housing;

FIG. 5 is an enlarged top plan view showing the springbiased clutch mechanism of the power take-off;

FIG. 6 is a sectional view taken along line 6—6 of FIG. 5;

FIG. 7 is an isolated perspective view showing the drive train of the power take-off driveably connected to the impeller of the snow blower by the intermediate drive;

FIG. 8 is a sectional view taken along line 8—8 of FIG. 4; and

FIG. 9 is a greatly enlarged side elevational view taken along line 9—9 of FIG. 8.

DESCRIPTION OF THE PREFERRED EMBODIMENTS

Referring now to the drawings wherein like reference numerals designate identical or corresponding parts throughout the several views, FIG. 1 shows a lawn mower 10 having a drive train 30 which driveably powers an accessory or implement 60. Although the drawings show only an attachable snow blower 61, it is to be understood that the drive train 30 could power any of a number of accessories or implements 60, including, but not limited to, leaf blowers, leaf mulchers, power rakes, augers, aerators, washers, or lawn edgers. The main consideration, of course, would be the economy resulting from using a single portable power source to power a variety of accessories or implements 60.

The lawn mower 10 includes a housing 11 supported by four wheels 12, which wheels 12 could be of the type which allow for vertical adjustment of the housing 11 with respect to the ground. The housing 11 has a deck 13, which is substantially horizontally disposed, and includes a skirt or flange 14, which depends downwardly from the outer edges of the deck 13.

As best shown in FIGS. 1 and 8, an engine 16 is mounted on and supported above the deck 13 by a plurality of spacers 17. The engine 16 is operated by conventional controls (not shown) which are normally mounted on the operator's handle 18 which is pivotally connected to the housing flange 14.

As shown in FIG. 8, the engine 16 is driveably connected to and rotates a drive shaft 19. The drive shaft 19 extends vertically downward through the deck 13 and is operably connected, as by bolt 20 to a cutting blade 21. The shaft 19 is supported and aligned with respect to the deck 13 by bearing 22; and shaft 19 is rotated in the direction of the cutting edge 23. A drive train 30 is operably connected to the drive shaft 19 at a point above the deck 13, as shown in FIG. 8. The drive train 30 includes a first pulley 31 attached to the shaft 19 intermediate the deck 13 and the engine 16. The first pulley 31 is driveably connected to a stacked pulley assembly 32 by engagement of a belt 33 with the lower pulley 34. The upper pulley 36 is in turn connected by belt 35 to a fourth pulley 37 which is fixed to a horizontally disposed shaft 38. Shaft 38 is supported for rotation about a horizontal axis by a pair of pillow block bearings 39, and shaft 38 terminates in a square female socket 41 which is disposed near the edge of deck 13 (FIG. 2).

As shown most clearly in FIGS. 5 and 6, the drive train 30 is movable between an activated and inactivated position by a spring-biased clutch which includes a clutch bar 42 which is pivotally attached to the deck 13 by pin 40 and is supported above the deck 13 by a bushing 43. The distal end of the clutch bar 42 is biased to the inactivated position by spring 44 and is movable to the activated position by cable 46 which is controlled from the operator's handle 18 by movement of lever 47 (FIG. 1). When it is desirable to inactivate the drive train 30, the tension in cable 46 is lessened and the spring 44 pulls the clutch bar 42 forward as it pivots about pin 40. This movement results in the loosening of belts 33 and 35 to the extent that rotation of pulley 31 is no longer transmitted to the other elements of the drive train 30.

As previously discussed, any of a number of implements or accessories 60 can be powered by coupling them to the drive train 30. This coupling can be conveniently accomplished by insertion of a square male shaft 48 (FIG. 3) into socket 41 (FIG. 2) and insertion of spring pin 49 into registerable openings in square shaft 48 and socket 41.

The attachable snow blower 61 of this invention (FIG. 3) includes an enclosure 62 having a substantially open front and an open slot 63 in the rear. The open slot 63 can be closed by a flap 64 pivotally attached to enclosure 62 by hinge 66. The forward end of the enclosure 62 is supported by ground wheels 67 and the sidewalls of enclosure 62 include bearings 68 which support and align the impeller shaft 69 and impeller 71. The upper forward portion of the enclosure 62 carries a number of directional deflectors 72 which are controlled by connection to hand control 73. The lower rear portion of the enclosure 62 includes a shield 74 attached by hinge 76 (FIG. 3). The shield 74 has several suction holes 77 formed therein and is adapted to completely cover the underside of the lawn mower housing 11, and the side clipping discharge port is covered by plate 78.

As best shown in FIGS. 3, 4 and 8, an air duct 79 interconnects the open slot 63 and an opening 81 in the deck 13. A hinged door 82 is provided to close the opening 81 when the snow blower 61 is not in use. Air paddles 83 (FIG. 9) are attached near the free ends of the cutting blade 21 and fins 84 extend upwardly and rearwardly from the cutting edge 23 at an angle of approximately 45°. A pair of spaced tabs 86 enclose the cutting blade 21 and a fastener 87 secures the air paddle 83 to the blade 21.

An intermediate drive 88 transmits the power from the socket 41 to the impeller shaft 69, which shaft 69 is shown fitted with a square female socket 89 (FIG. 3). The intermediate drive 88 includes a pair of pulleys 91 secured to shafts 48 and 92. The shafts 48 and 92 are journaled in bearings 93 carried in the sidewalls of casing 94 and cover plate 96. A belt 97 driveably connects the pulleys 91 and transmits the rotational power from the engine 16 to the snow blower 61.

The anchoring of the snow blower 61 to the lawn mower 10 is best shown by reference to FIGS. 2-4 and 8. The snow blower enclosure 62 and the attached shield 74 are positioned as shown in FIG. 3. The hinged connecting strap 101 is raised from the position of FIG. 3 to allow the lawn mower deck 13 to pass below strap 101. The lawn mower 10 is then moved to a position where the lawn mower housing 11 is positioned directly above the shield 74 and the free end of strap 101 engages clip 102. The connecting strap 101 is then secured to the deck 13 by winged bolts 103 or other suitable fasteners. The shield 74 is raised to the position shown in FIG. 8 and secured to flange 14 by fastener 104. The intermediate drive 88 is attached by spring pins 49 and angle plate 106. With the flap 64 and door 82 both in the open position, the air duct 79 is attached to the deck 13 by ears 107 and is attached to the enclosure 62 by the slotted end 108.

With the snow blower 61 attached to the lawn mower 10, the cable 46 is tightened to overcome the force of spring 44 and the drive train 30 is thus driveably coupled to the impeller 71 to rotate the impeller 71, as shown in FIG. 7. Snow is contacted by the impeller 71 and forced upward within the enclosure 62 and out of the upper forward portion in a direction controlled by the position of deflectors 72. The snow is further forced from the enclosure 62 by the mass of air forced through the air duct 79 by air paddles 83 attached to the rotating blade 21. The flow of air is substantially as shown by the directional arrows of FIG. 8, and the air flow aids in moving the snow and maintaining the enclosure free of clogging when used in wet snow.

Thus, it can be seen that the present invention accomplishes at least all of the stated objectives.

Obviously many modifications and variations of the invention are possible in light of the above teachings. It is therefore to be understood that, within the scope of the appended claims, the invention may be practiced otherwise than as specifically described.

I claim:

1. In combination with a lawn mower including a housing connected to and supported by a plurality of ground engaging wheels, the housing including a substantially horizontally disposed deck and a downwardly disposed flange extending from the outer edges of the deck, an engine disposed above and supported by the deck, a vertically disposed drive shaft driveably rotated by the engine, and a cutting blade operably connected to the drive shaft at a point below the deck, the improvement comprising:
   a drive train operably connected to said drive shaft;
   said implement being a blower including an enclosure having a substantially open front and having an open slot in the rear thereof;
   said deck including an opening at a point above said cutting blade; and
   an air duct interconnecting the open slot of the enclosure and the opening in the deck, whereby air is forced through the air duct and out of the open front of the enclosure.

2. The apparatus of claim 1 wherein the open slot in the enclosure is disposed at a point above the deck of said lawn mower.

3. The apparatus of claim 1 further comprising:
   air paddles attached near the free ends of said cutting blade.

4. The apparatus of claim 1 further comprising:
   a shield attached to the bottom side of said lawn mower housing.

5. The apparatus of claim 3 further comprising:
   a shield attached to the bottom side of said lawn mower housing.

6. The apparatus of claim 3 wherein said air paddles extend upwardly and rearwardly from the cutting edge of said cutting blade at an angle of approximately forty-five degrees (45°).

7. The apparatus of claim 4 wherein said shield includes a plurality of suction holes formed therein.

8. The apparatus of claim 4 wherein said shield has one end hingedly attached to the blower enclosure, and the opposite end attached to the downwardly disposed flange of said lawn mower housing.

9. The apparatus of claim 6 wherein said air paddles include a pair of spaced horizontal tabs which receive the cutting blade therebetween.

* * * * *